United States Patent
Brown et al.

(10) Patent No.: US 6,938,213 B2
(45) Date of Patent: Aug. 30, 2005

(54) TRACKING USER AVAILABILITY FOR PARTICIPATION IN MESSAGING SESSIONS

(75) Inventors: Michael Wayne Brown, Georgetown, TX (US); Kelvin Roderick Lawrence, Round Rock, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 09/957,277

(22) Filed: Sep. 20, 2001

(65) Prior Publication Data

US 2003/0052915 A1 Mar. 20, 2003

(51) Int. Cl.⁷ .............................................. G09G 5/00
(52) U.S. Cl. ....................................... 715/758; 715/752
(58) Field of Search .................................. 715/751, 752, 715/753, 758, 760

(56) References Cited

U.S. PATENT DOCUMENTS

| | | | |
|---|---|---|---|
| 4,972,461 A | 11/1990 | Brown et al. ................... 379/67 |
| 5,347,306 A | 9/1994 | Nitta ............................ 348/15 |
| 5,493,692 A | 2/1996 | Theimer et al. ............. 455/26.1 |
| 5,528,745 A * | 6/1996 | King et al. ................... 345/753 |
| 5,627,978 A | 5/1997 | Altom et al. ................ 395/330 |
| 5,899,979 A * | 5/1999 | Miller et al. ..................... 705/9 |
| 5,960,173 A | 9/1999 | Tang et al. ............. 395/200.31 |
| 6,034,683 A * | 3/2000 | Mansour et al. ............. 345/764 |
| 6,072,942 A | 6/2000 | Stockwell et al. ...... 395/200.36 |
| 6,094,681 A | 7/2000 | Shaffer et al. ............... 709/224 |
| 6,111,572 A | 8/2000 | Blair et al. .................. 345/333 |
| 6,141,005 A | 10/2000 | Hetherington et al. ...... 345/333 |
| 6,147,977 A | 11/2000 | Thro et al. ................... 370/265 |
| 6,216,165 B1 | 4/2001 | Woltz et al. ................. 709/232 |
| 6,411,947 B1 | 6/2002 | Rice et al. ..................... 706/47 |
| 6,425,012 B1 * | 7/2002 | Trovato et al. .............. 709/227 |
| 6,640,230 B1 * | 10/2003 | Alexander et al. ............. 707/10 |
| 6,714,967 B1 | 3/2004 | Horvitz ....................... 709/206 |
| 6,768,790 B1 | 7/2004 | Manduley et al. ........ 379/88.13 |

OTHER PUBLICATIONS

IBM Docket AUS920010576US1, Specifying Monitored User Participation in Messaging Sessions, Michael Wayne Brown, et al., 56 pages.

IBM Docket AUS920010649US1, Controlling Throughput of Message Requests in a Messaging System, Michael Wayne Brown, et al., 70 pages.

* cited by examiner

*Primary Examiner*—Kristine Kincaid
*Assistant Examiner*—Thanh Vu
(74) *Attorney, Agent, or Firm*—Marilyn Smith Dawkins; Amy J. Pattillo

(57) ABSTRACT

A method, system and program for tracking user availability are provided. Time estimates of a user availability are compiled for a separate user from among multiple users for participation in a messaging session. Then, the compiled time estimates of user availability are specified for output to at least one other user from among the multiple users, such that the at least one other user is enabled to track user availability for the separate user. In particular, compiled time estimates may be specified according to graphical, audio, video, or textual output preferences for the at least one other user. In addition, the compiled time estimates may be specified according to a current time zone for the at least one other user.

20 Claims, 7 Drawing Sheets

| USER ID | SCHEDULE | CURRENT TIME ZONE | GENERAL SCHEDULE PREFERENCES | PARTICIPATION | OUTPUT PREFERENCES |
|---|---|---|---|---|---|
| User A | On 4-5 PM | Buenos Aires | Sleep 8 hours<br>Off 7-8 | Channel A - 2 hours<br>Channel B - 2 hours | PDA - Minimal<br>Home Computer - Schedule |
| User B | On 1-8 PM | Midatlantic | Sleep 4 hours<br>Exercise 2 hours | Channel A - 2 entries | Telephone - All text |

Figure 4

TRACKING USER AVAILABILITY FOR PARTICIPATION IN MESSAGING SESSIONS

CROSS-REFERENCE TO RELATED APPLICATIONS

The present application is related to the following co-pending applications, incorporated herein by reference:

(1) U.S. patent application Ser. No. 09/856,766; and
(2) U.S. patent application Ser. No. 09/956,765.

BACKGROUND OF THE INVENTION

1. Technical Field

The present invention relates in general to electronic communications and, in particular, to tracking user availability for participation in messaging sessions. Still more particularly, the present invention relates to estimating user availability for participation in messaging sessions according to time zones and user scheduling.

2. Description of the Related Art

As the Internet and telephony expand, the ease of communications between individuals in different locations continues to expand as well. One type of electronic communication is supported by messaging which includes the use of computer systems and data communication equipment to convey messages from one person to another, as by e-mail, voice mail, unified messaging, instant messaging, or fax.

While e-mail has already expanded into nearly every facet of the business world, other types of messaging continue to forge into use. For example, instant messaging systems are typically utilized in the context of an Internet-supported application that transfers text between multiple Internet users in real time.

In particular, the Internet Relay Chat (IRC) service is one example of instant messaging that enables an Internet user to participate in an on-line conversation in real time with other users. An IRC channel, maintained by an IRC server, transmits the text typed by each user who has joined the channel to the other users who have joined the channel. An IRC client shows the names of the currently active channels, enables the user to join a channel, and then displays the other channel participant's words on individual lines so that the user can respond.

Similar to IRC, chat rooms are often available through on-line services and provide a data communication channel that links computers and permits users to converse by sending text messages to one another in real-time.

Some instant messaging systems allow users to designate an availability status from among several pre-determined availability status indicators. For example, in U.S. Pat. No. 5,960,173, a user may designate an availability status as "attentive", "idle", "do not disturb", or "absent". Other instant messaging systems may allow a user to indicate that the user is not available and specify a message that is made available to other users attempting to contact the user.

However, instant messaging systems are limited in that while a user can select an availability status, that status does not include an estimated length of time of availability or indicators of upcoming scheduling conflicts that may cause a user to leave a messaging session. Moreover, when a user is absent or unavailable, instant messaging systems are limited in that other users are not provided with an estimated time when the user may be available again.

Further, some messaging systems will allow a user to view the events scheduled for another user. For example, in U.S. Pat. No. 6,034,683, schedules of other users are viewable within a browser. However, messaging systems are limited in that while a user may view other user's schedules, the scheduled events are those added to the schedule by the user and do not provide information estimating when a user may be available for messaging.

In view of the foregoing, it would be advantageous to provide a method, system and program for estimating availability of users for participation in a messaging session. In particular, it would be advantageous to provide a method, system, and program for notifying users of other users' availability taking into account time zone differences and scheduling.

SUMMARY OF THE INVENTION

In view of the foregoing, it is therefore an object of the present invention to provide an improved method, system and program for performing electronic communications.

It is another object of the present invention to provide a method, system and program for tracking user availability for participation in messaging sessions.

It is yet another object of the present invention to provide a method, system and program for estimating user availability for participation in messaging sessions according to time zones and user scheduling.

According to one aspect of the present invention, time estimates of a user availability are compiled for a separate user from among multiple users for participation in a messaging session. Then, the compiled time estimates of user availability are specified for output to at least one other user from among the multiple users, such that the at least one other user is enabled to track user availability for the separate user. In particular, compiled time estimates may be specified according to graphical, audio, video, or textual output preferences for the at least one other user. In addition, the compiled time estimates may be specified according to a current time zone for the at least one other user.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 illustrates a block diagram of a data storage structure for user profiles in accordance with the method, system and program of the present invention;

DETAILED DESCRIPTION OF THE PREFERRED EMBODIMENT

A method, system and program for tracking user availability according to a current time zone, scheduling, and general scheduling preferences are provided.

A "messaging session" preferably includes, but is not limited to, any combination of voice, graphical, video, and/or text messages, instant and/or delayed, transmitted between multiple users via a network. Messaging sessions may include use of chat rooms, instant messages, e-mail, IRC, conference calling and other network methods of providing a channel for users to communicate within. Further, messaging sessions may include communications such as voice, video, and text transmissions between multiple telephony devices.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

The present invention may be executed in a variety of systems, including a variety of computing systems and electronic devices under a number of different operating systems. In one embodiment of the present invention, the messaging system is a portable computing system such as a notebook computer, a palmtop computer, a personal digital assistant, a telephone or other electronic computing system that may also incorporate communications features that provide for telephony, enhanced telephony, messaging and information services. However, the messaging system may also be, for example, a desktop computer, a network computer, a midrange computer, a server system or a mainframe computer. Therefore, in general, the present invention is preferably executed in a computer system that performs computing tasks such as manipulating data in storage that is accessible to the computer system. In addition, the computer system preferably includes at least one output device and at least one input device.

Figure 1:
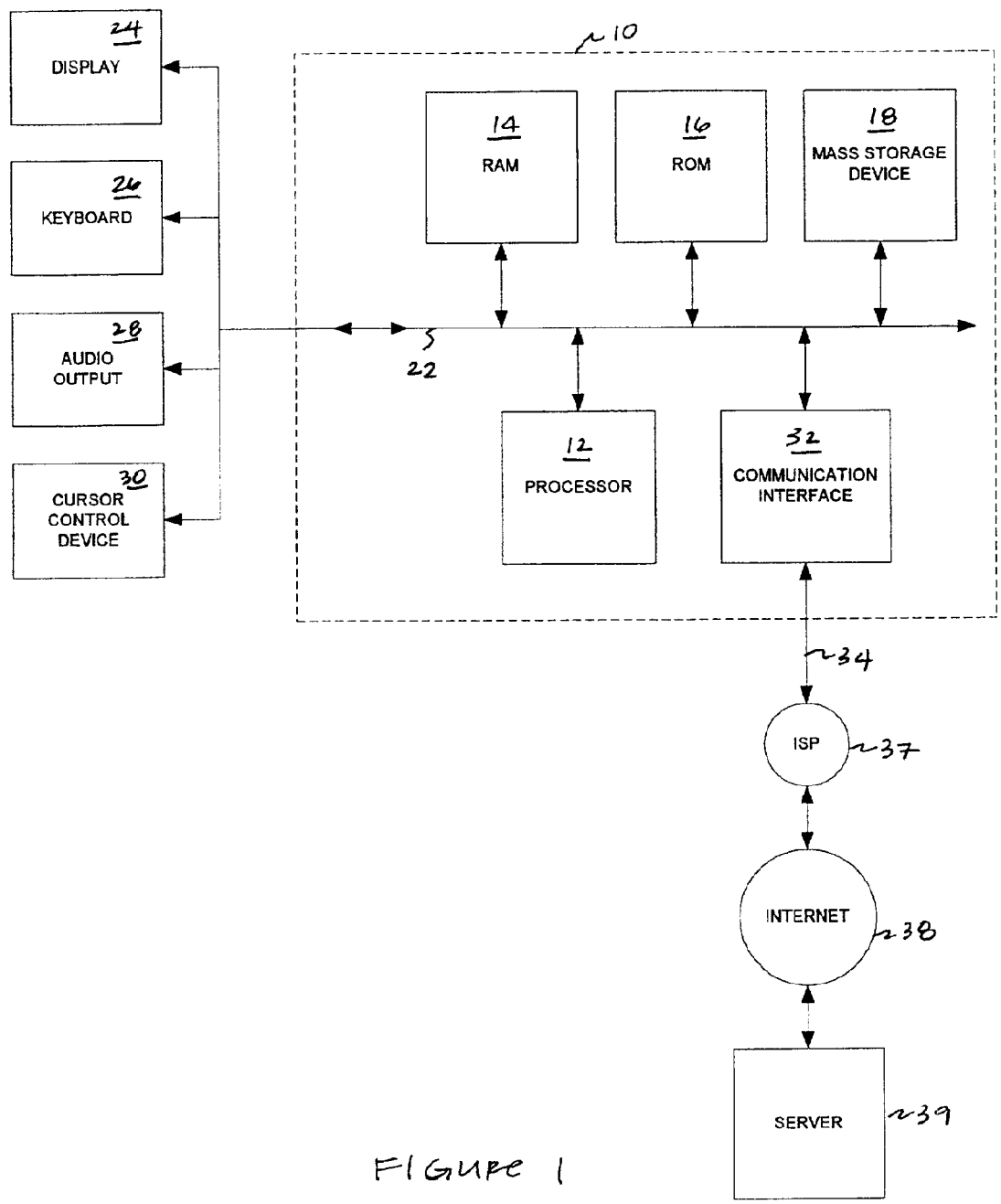
FIG. 1 depicts one embodiment of a computer system with which the method, system and program of the present invention may advantageously be utilized.

Referring now to the drawings and in particular to FIG. 1, there is depicted one embodiment of a computer system with which the method, system and program of the present invention may advantageously be utilized. Computer system 10 comprises a bus 22 or other communication device for communicating information within computer system 10, and at least one processing device such as processor 12, coupled to bus 22 for processing information. Bus 22 preferably includes low-latency and high-latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowcharts of FIGS. 10, 11, and others described herein. Alternatively, the steps of the present invention might be performed by specific hardware components that contain hardwire logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patters of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of nonvolatile media is storage device 18. Volatile media includes dynamic memory such as RAM 14. Transmission media includes coaxial cables, copper wire or fiber optics, including the wires that comprise bus 22. Transmission media can also take the form of acoustic or light waves, such as those generated during radio wave or infrared data communications.

Moreover, the present invention may be downloaded as a computer program product, wherein the program instructions may be transferred from a remote computer such as a server 39 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide area network (WAN), or as depicted herein, directly to an Internet service Provider (ISP) 37. In particular, network link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital data streams. The signals through the various networks and the signals on network link 34 and through communication interface 32, which carry the digital data to and from computer system 10, are exemplary forms of carrier waves transporting the information.

Further, multiple peripheral components may be added to computer system 10. For example, an audio output 28 is attached to bus 22 for controlling audio output through a speaker or other audio projection device. A display 24 is also attached to bus 22 for providing visual, tactile or other graphical representation formats. A keyboard 26 and cursor control device 30, such as a mouse, trackball, or cursor direction keys, are coupled to bus 22 as interfaces for user inputs to computer system 10. In alternate embodiments of the present invention, additional input and output peripheral components may be added.

Messaging Systems Context

Figure 2:
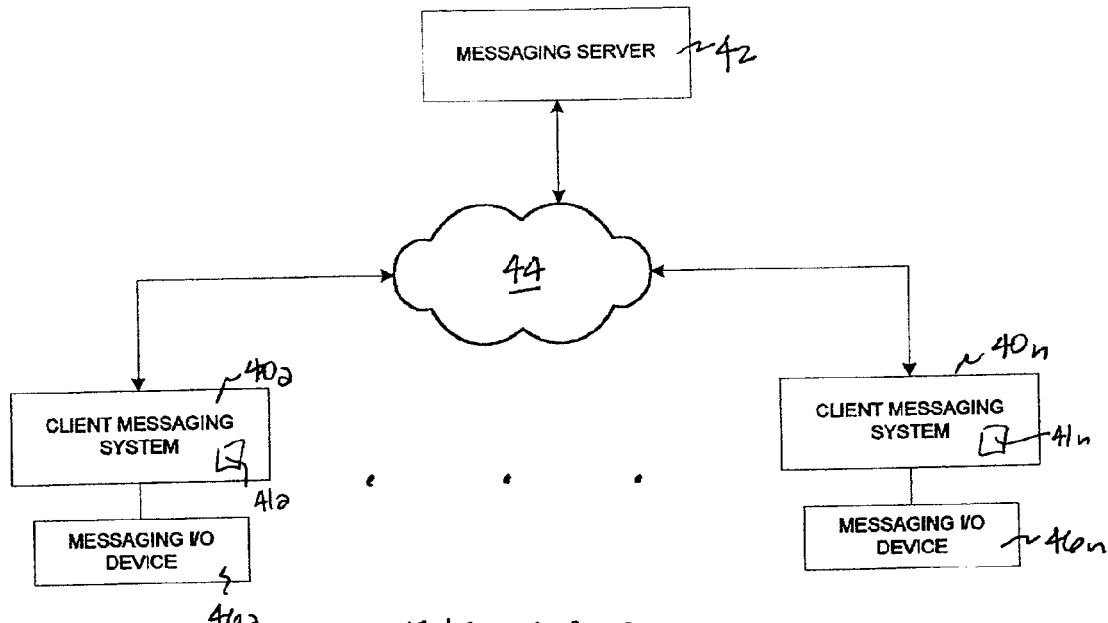
FIG. 2 illustrates a simplified block diagram of a client/server environment in which electronic messaging typically takes place in accordance with the method, system and program of the present invention.

With reference now to FIG. 2, there is depicted a simplified block diagram of a client/server environment in which electronic messaging typically takes place in accordance with the method, system and program of the present invention. The client/server environment is implemented within multiple network architectures. For example, the architecture of the World Wide Web (the Web) follows a traditional client/server modeled environment.

The terms "client" and "server" are used to refer to a computer's general role as a requester of data (the client) or provider of data (the server). In the Web environment, web browsers such as Netscape Navigator typically reside on client messaging systems 40a–40n and render Web documents (pages) served by at least one messaging server such as messaging server 42. Additionally, each of client messaging systems 40a–40n and messaging server 42 may function as both a "client" and a "server" and may be implemented utilizing a computer system such as computer system 10 of FIG. 1. Further, while the present invention is described with emphasis upon messaging server 42 controlling a messaging session, the present invention may also be performed by client messaging systems 40a–40n engaged in peer-to-peer network communications via a network 44.

The Web may refer to the total set of interlinked hypertext documents residing on servers all around the world. Network 44, such as the Internet, provides an infrastructure for transmitting these hypertext documents between client messaging systems 40a–40n and messaging server 42. Documents (pages) on the Web may be written in multiple languages, such as Hypertext Markup Language (HTML) or Extensible Markup Language (XML), and identified by Uniform Resource Indicators (URIs) that specify the particular messaging server 42 and pathname by which a file can be accessed, and then transmitted from messaging server 42 to an end user utilizing a protocol such as Hypertext Transfer Protocol (HTTP). Web pages may further include text, graphic images, movie files, and sounds as well as Java applets and other small embedded software programs that execute when the user activates them by clicking on a link.

Advantageously, in the present invention, a client enters a message via one of messaging input/output (I/O) devices 46a–46n for a messaging session at a client messaging system such as client messaging system 40a. The message entry is transmitted to messaging server 42. Messaging server 42 then distributes the message entry to the users participating in the messaging session via network 44.

In addition, in the present invention, messaging server 42 tracks user availability and specifies and distributes that user availability among client messaging systems 40a–40n according to each user's preferences.

While in the present embodiment messaging server 42 handles transmission of message entries and user availability information together, in alternate embodiments, user availability information may be accessible to client messaging systems 40a–40n as files in a directory that is accessible to a user. In addition, the user availability information may be transmitted as e-mail to participants in the messaging session. Moreover, the present invention may utilize a traditional IRC channel for transmitting message entries and a special IRC device channel opened in parallel with the traditional IRC channel for transmitting user availability information among users. Furthermore, other types of messaging systems may be utilized to implement the present invention, as will be understood by one skilled in the art.

In addition, while in the present invention user availability information is described with reference to a messaging session, in alternate embodiments, user availability information may be transmitted independent of a messaging session and/or with reference to an alternate application or transmission.

Advantageously, according to one embodiment of the present invention, the steps of entering a schedule, general scheduling preferences, and other functions may be performed by an application executing in each of client messaging systems 40a–40n, such as client recording applications 41a–41n. Further, client messaging systems 40a–40n may include or receive information from personal health devices, personal exercise devices, global positioning systems, and other devices that provide personal information about a user that client recording applications 41a–41n may utilize to adjust scheduling. For example, where personal health information is received, a user's schedule may be automatically updated by client recording applications 41a–41n to include a meal at a particular time.

Figure 3:
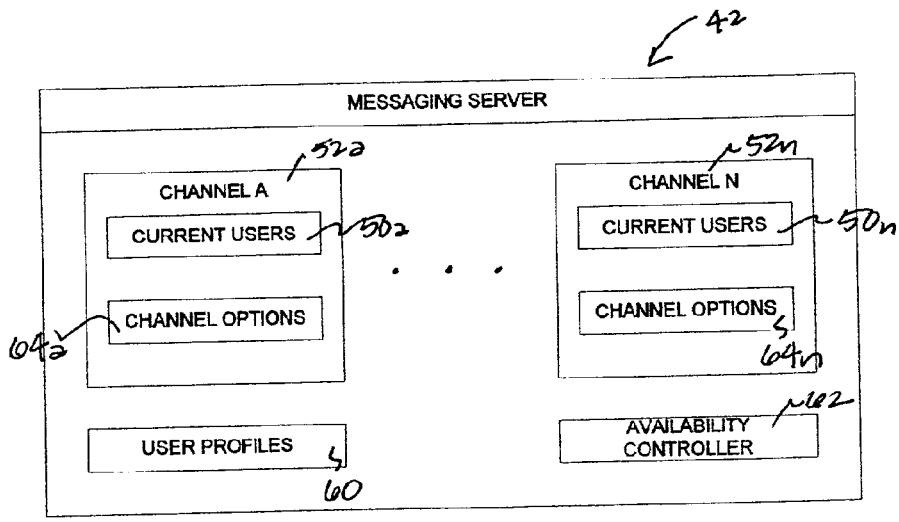
FIG. 3 depicts a block diagram of one embodiment of a messaging server in accordance with the method, system and program of the present invention.

Referring now to FIG. 3, there is illustrated a block diagram of one embodiment of a messaging server in accordance with the method, system and program of the present invention. As depicted, messaging server 42 includes an availability controller 62 that is provided to control the process steps of messaging server 42 as will be further described.

Messaging server 42 also includes multiple channels 52a–52n. Each of channels 52a–52n may represent a separate information path within messaging server 42 in which multiple users may participate in a messaging session. Messaging server 42 may have a defined number of channels 52a–52n or may allow users to create new channels as needed. In particular, channels provide network paths between multiple users for both voice and text communications. Each of channels 52a–52n may further include multiple distinguishable topics.

In addition, each of channels 52a–52n preferably includes a table of current users 50a–50n. As a user selects to participate in channels 52a–52n, the user's identification is added to the table of current users 50a–50n for that channel.

Messaging server 42 includes a user profiles database 60 that includes profile information for each user, including, but not limited to, a user identification, a user history, a user schedule, current time zone, general scheduling preferences, arid current participation recorded as the user participates in messaging sessions. The user identification stored in user profiles 60 during registration is utilized across multiple channels for identifying entries provided by that user.

Availability controller 62 is advantageously a software application executing within messaging server 42 to control determination of user availability and specialized distribution of user availability.

Channel options are included with each channel as depicted by channel options 64a–64n. Channel options preferably include authorization levels required to receive user availability for a channel. Advantageously, channel options may be selected when a user requests a new channel. Alternatively, a user may select a channel based on the authorization levels set in the channel options for that channel. Moreover, a business or other network service provider may automatically set channel options for channels.

With reference now to FIG. 4, there is depicted a block diagram of a data storage structure for user profiles in accordance with the method, system and program of the present invention. As depicted, the data corresponding to user profiles is preferably stored in a database storage structure such as database table 66. The example database table 66 is provided to depict a selection of fields 68 which may be included in a data storage structure. Fields 68 include a user identification (ID), a schedule, a current time zone, general schedule preferences, and current participation levels. In addition, although not depicted, a history for each user may be stored according to user ID. In an alternate embodiment, alternate selections for user profile field information may be included. In addition, alternate types of data storage structures and methods may be utilized.

In particular, the schedule depicted in database table 66 for each user ID may be received in multiple formats and reformatted by the messaging server to a uniform scheduling format. Alternatively, schedules may be in multiple formats within database table 66. Either way, advantageously, the present invention may utilize schedules created with multiple, diverse, heterogenous scheduling applications.

The time zones entered within database table 66 may be entered by a user as the user moves from one time zone to another. Alternatively, as a user adjusts the time zone for the computer system utilized by the user, the messaging server may detect the currently selected time zone, request that the user verify the time zone, and store the time zone in database table 66. As another alternative, dependent upon the ISP utilized by a user to access the Internet, the messaging server may detect a time zone associated with the area code of the dial-up number. Furthermore, where a global positioning system (GPS) is included within the computer system, the GPS will detect the location of the device such that the messaging server may determine the time zone from a location.

General scheduling preferences within database table 66 may be selected by each user and generated by the messaging server according to a user schedule history. Advantageously, a user may designate general preferences, such as sleeping and eating times, such that such information does not have to be placed on a daily schedule, but the messaging server will utilize such information to estimate user availability. As the messaging server builds a history of scheduling for a user, the messaging server may determine general scheduling preferences for that user and allow a user to affirm placement of those general scheduling preferences in database table 66.

A messaging server preferably tracks each user's participation in messaging sessions according to channel and topic. In addition, applications executing on each client messaging system may determine the user's participation in not only messaging sessions, but other software applications and messaging sessions across multiple messaging servers. Such information may then be supplied to each messaging server to be added to database table 66.

Output preferences within database table 66 may be selected by each user according to the device being utilized, the location of the device being utilized, a current time zone, and other criteria that are selectable by each user. For example, a user may select to receive user availability data output in a more simplified format when utilizing a personal digital assistant, however may also select to received user availability data output in a larger format, such as that depicted in FIG. 8, when utilizing a personal computer with a larger display area. In addition, a user may select to receive user availability information in a textual, graphical, audio, or video format.

Figure 5:
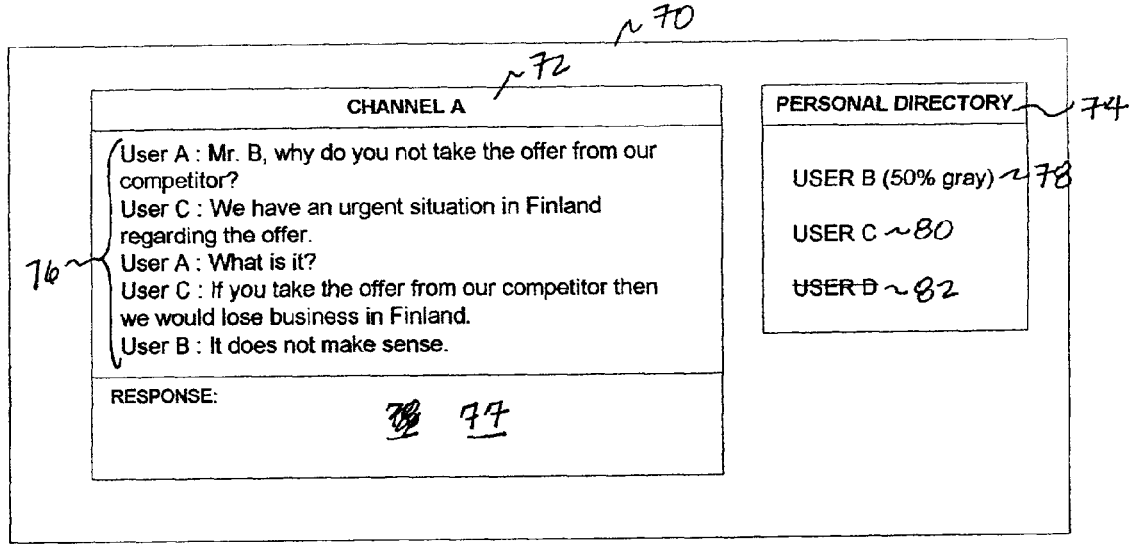
FIG. 5 depicts a graphical representation of a messaging session window with user availability depicted in a separate window in accordance with the method, system, and program of the present invention.

Referring now to FIG. 5, there is illustrated a graphical representation of a messaging session window with user availability depicted in a separate window in accordance with the method, system, and program of the present invention. As depicted, a user interface 70 includes a messaging session window 72 and a user availability window 74.

Multiple message entries 76 are illustrated within messaging session window 72. In the present example, message entries 76 include message entries from users A, B, and C. In addition, messaging session window 72 includes a response block 77 through which a user may enter a new message entry utilizing text, audio, graphics, and video.

The availability of users B, C, and D is depicted within user availability window 74. In the present example, user availability window 74 includes users B, C, and D as part of a personal directory of user identifications selected by user A.

Each user preferably selects a unit of time within which other users are going to enter or leave a messaging session for which notification should be received. In the present example, user A has selected to be notified by graphical indications within user availability window 74 when an hour or less remains before a user will leave or enter a messaging session.

In the present example, the text depicted for user B at indicator 78 is displayed at 50% gray to indicate when user B will likely fade out of the messaging session within the next hour. As it becomes more likely that user B will fade out of the messaging session, the user identification for user B will continue to decrease in visibility. Alternatively, the text may adjust in transparency, color, or other graphical adjustment that notifies a user as to the expected time left for another user to participate in the messaging session. In particular, although not depicted, where one user is participating in multiple channels, the expected user availability may be distinguished according to channel.

In addition, in the present example, the text depicted for user C at indicator 80 is displayed at 100% gray to indicate that user C will likely participate in the messaging session for the next hour. Further, the text depicted for user D at indicator 82 is displayed with a strikethrough to indicate that user D is not participating currently and will likely not participate within the next hour. If it were likely that user D may begin to participate in the messaging session within the next hour, other graphical adjustments may be made to the text including, but not limited to, adjusting the text to a shade of gray or adjusting the thickness of the strike through. In addition, coloring, transparency and other graphical adjustments may be made to the text. Further, where a user prefers audio output to graphical output, audio adjustments to the user identification output may be made.

Figure 6:
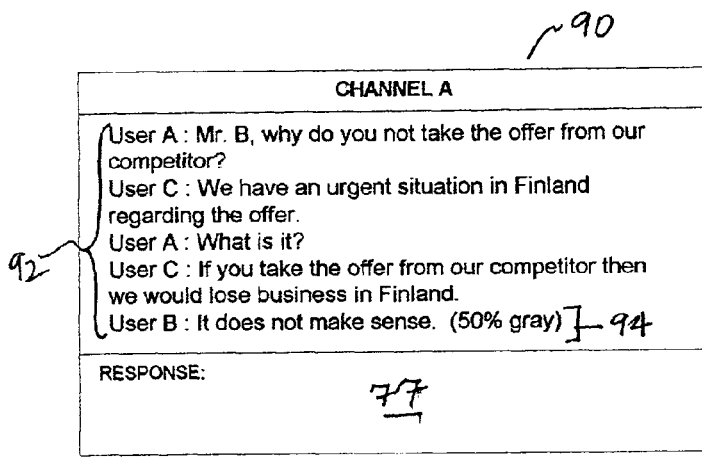
FIG. 6 illustrates a graphical representation of a messaging session where the message entries are adjusted to indicate user availability in accordance with the method, system, and program of the present invention.

With reference now to FIG. 6, there is illustrated a graphical representation of a messaging session where the message entries are adjusted to indicate user availability in accordance with the method, system, and program of the present invention. As depicted, a messaging session window 90 includes multiple message entries 92 from users A, B, and C. Further, as illustrated, the message entry from user B depicted at indicator 94 is displayed at 50% gray to indicate that user B will likely fade out of the messaging session within the next hour. Alternatively, message entries by user B may become more transparent, adjust in color, and other graphical adjustments. Moreover, where message entries are output as audio or via video, adjustments may be made to indicate that user B will likely fade out of the messaging session within the next hour or other configurable time period.

Figure 7:
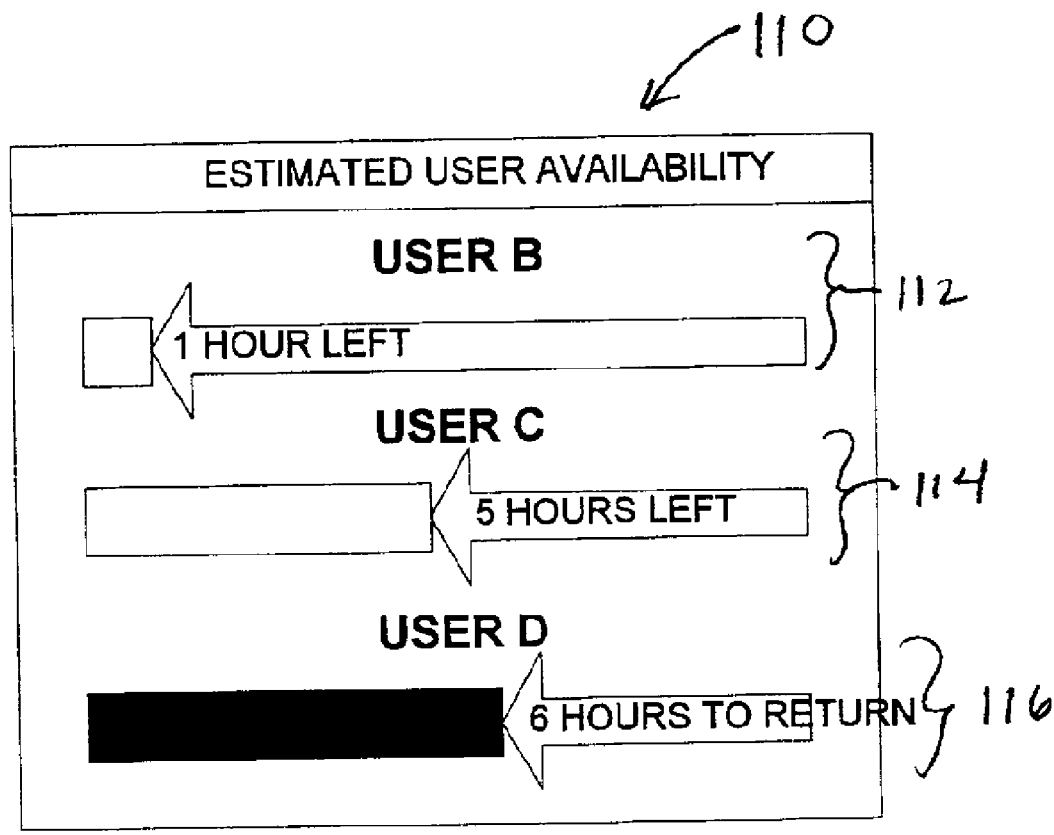
FIG. 7 depicts a graphical representation of a user availability interface where user availability is indicated by estimated times in accordance with the method, system, and program of the present invention.

Referring now to FIG. 7, there is depicted a graphical representation of a user availability interface where user availability is indicated by estimated times in accordance with the method, system, and program of the present invention. As illustrated, a user availability window 110 includes estimated availability for users B, C, and D. As indicated at reference numeral 112, an estimate of one hour of availability is depicted for user B. Next, as indicated at reference numeral 114, an estimate of 4 hours of availability is illustrated for user C. Further, as indicated at reference numeral 116, an estimate of 6 hours remains until user D is available.

In the present example, in addition to indicating an estimated number of hours, a graphical bar is utilized such that a user may more easily visibly compare the estimated times for each user.

Figure 8:
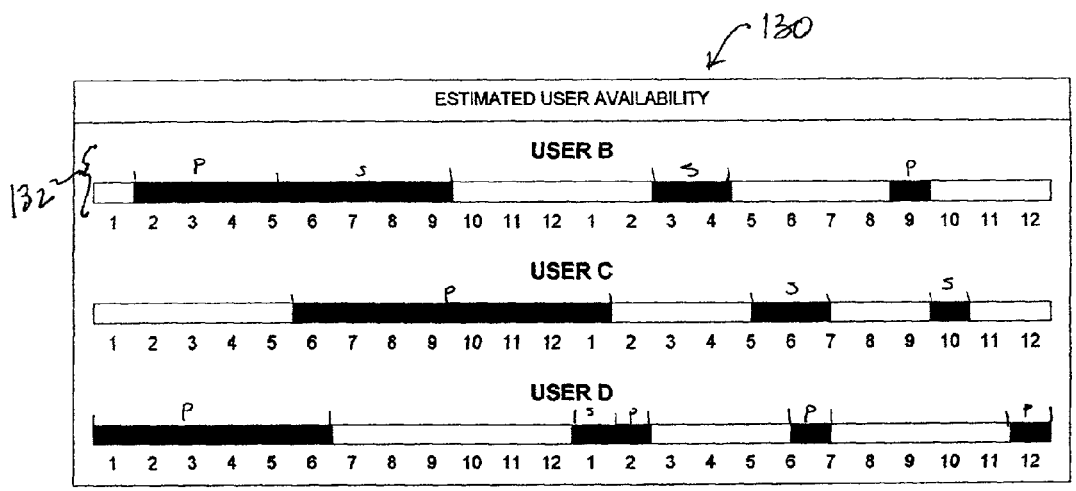
FIG. 8 illustrates a graphical representation of a user availability interface where user availability is indicated by compiled schedules adjusted according to the time zone of the user requesting the user availability in accordance with the method, system, and program of the present invention.

With reference now to FIG. 8, there is illustrated a graphical representation of a user availability interface where user availability is indicated by compiled schedules adjusted according to the time zone of the user requesting the user availability in accordance with the method, system, and program of the present invention. As depicted, a user availability window 130 includes scheduled availability for users B, C, and D according to the current time zone of user A. Advantageously, scheduled availability for each of the users is adjusted to the current time zone of user A such that user A is provided with a display of availability for other users in other time zones without additional conversions by user A. As indicated at reference numeral 132, a compiled schedule for user B indicates that user B is available for another hour prior to likely being unavailable for eight hours.

Advantageously, scheduled availability is distinguished according to the source of the scheduled availability. In the present example, sections of time blocked off are either indicated by a "P" or an "S". "P" represents scheduling performed by the messaging server based on user scheduling preferences and scheduling history. "S" represents scheduling received from a user schedule. Additional compiled schedules are depicted within user availability window 130 for users C and D. Further, in alternate embodiments, additional sources may be utilized for determining scheduled availability, where those sources are distinguished within window 130.

Figure 9:
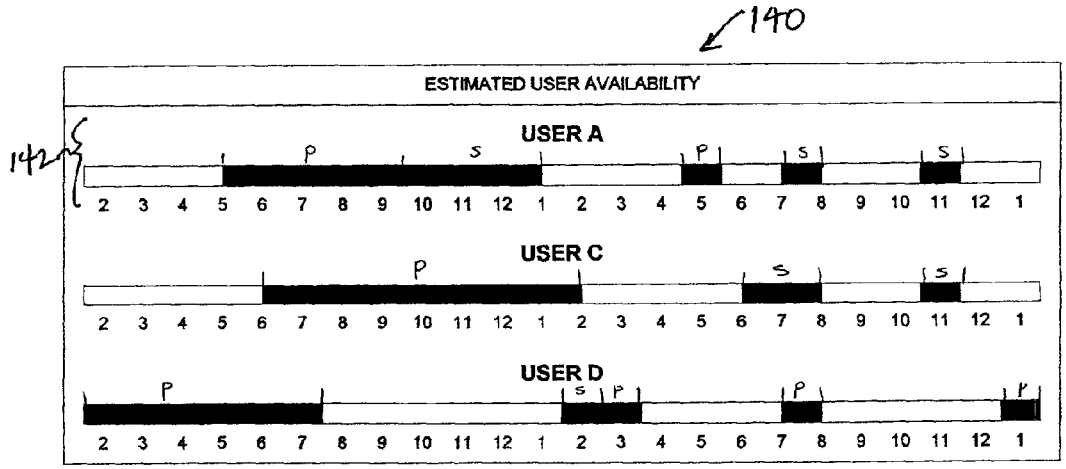
FIG. 9 depicts a graphical representation of a user availability interface where user availability is indicated by compiled schedules adjusted according to the time zone of user B in accordance with the method, system, and program of the present invention.

Referring now to FIG. 9, there is depicted a graphical representation of a user availability interface where user availability is indicated by compiled schedules adjusted according to the time zone of user B in accordance with the method, system, and program of the present invention. As illustrated, a user availability window 140 includes scheduled availability for users A, C, and D according to the current time zone for user B. As indicated at reference numeral 142, a compiled schedule for user A indicates that user A is available for another three hours. In particular, for users C and D, the estimated availability remains the same, however the times adjust according to user B's time zone. For example, in comparing the user availability window of FIG. 8 with user availability window 140, user B's time zone differs from user A's by an hour.

Figure 10:
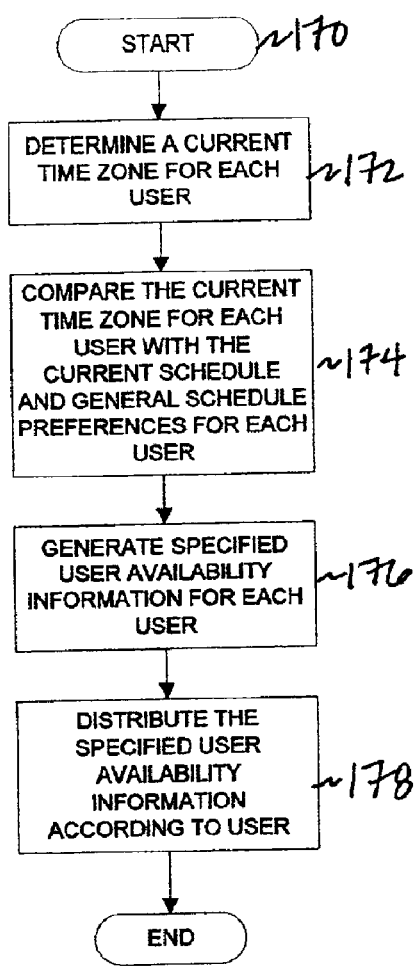
FIG. 10 illustrates a high level logic flowchart of a process and program for controlling distribution of user availability in accordance with the method, system, and program of the present invention.

With reference now to FIG. 10, there is illustrated a high level logic flowchart of a process and program for controlling distribution of user availability in accordance with the method, system, and program of the present invention. As depicted, the process starts at block 170 and thereafter passes to block 172. Block 172 illustrates determining a current time zone for each user. Next, block 174 depicts comparing the current time zone for each user with the current schedule and general schedule preferences for each user. Thereafter, block 176 illustrates generating specified user availability information for each user according to the directory for each user. Next, block 178 depicts distributing the specified user availability information according to each user, and the process ends.

Figure 11:
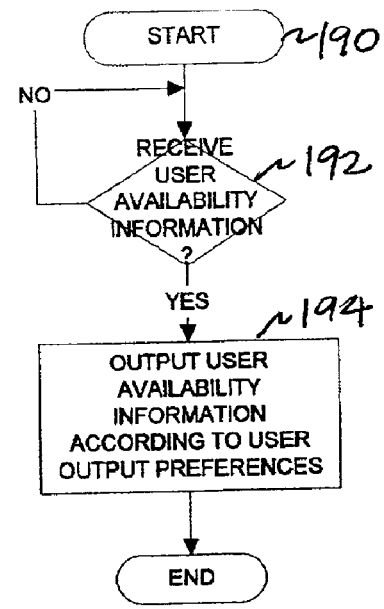
FIG. 11 depicts a high level logic flowchart of a process and program for outputting user availability in accordance with the method, system, and program of the present invention.

Referring now to FIG. 11, there is depicted a high level logic flowchart of a process and program for outputting user availability in accordance with the method, system, and program of the present invention. As illustrated, the process starts at block 190 and thereafter proceeds to block 192. Block 192 depicts a determination as to whether or not user availability information is received. If user availability information is not received, then the process iterates at block 192. If user availability information is received, then the process passes to block 194. Block 194 illustrates outputting user availability information according to user output preferences, and the process ends.

While the invention has been particularly shown and described with reference to a preferred embodiment, it will be understood by those skilled in the art that various changes in form and detail may be made therein without departing from the spirit and scope of the invention.

What is claimed is:

1. A method for tracking user availability, said method comprising the steps of:
   compiling time estimates of a remaining user availability for participation in a messaging session for a separate user from among a plurality of users currently available for participation in said messaging session;
   specifying said compiled time estimates of said remaining user availability for output to at least one other user from among said plurality of users prior to said at least one other user initiating said messaging session with said separate user; and adjusting said output of said remaining user availability as time passes to indicate a current remaining user availability, such that said at least one other user is enabled to track said remaining user availability for said separate user.

2. The method for tracking user availability according to claim 1, said method further comprising the step of:

compiling said time estimates, and specifying said compiled time estimates, at a messaging server communicatively connected to a plurality of client messaging systems each enabled to receive said specified compiled time estimates.

3. The method for tracking user availability according to claim 1, said step of compiling time estimates of a remaining user availability further comprising the step of:

compiling said time estimates from a selection from among a schedule for said separate user, a set of scheduling preferences for said separate user, and a scheduling history for said separate user.

4. The method for tracking user availability according to claim 1, said step of specifying said compiled time estimates of said remaining user availability further comprising the step of:

specifying said compiled time estimates of for output to said at least one other user according to output preferences of said at least one other user.

5. The method for tracking user availability according to claim 1, said step of specifying said compiled time estimates of said remaining user availability further comprising the step of:

specifying said compiled time estimates for output to said at least one other user according to a current time zone for said at least one other user.

6. The method for tracking user availability according to claim 1, said step of specifying said compiled time estimates of said remaining user availability further comprising the step of:

distinguishing in said output between time scheduled by said separate user and time estimated by said messaging server according to a set of scheduling preferences for said separate user and a scheduling history for said separate user.

7. The method for tracking user availability according to claim 1, said step of adjusting said output of said remaining user availability as time passes to indicate a current remaining user availability further comprising the step of:

responsive to said current remaining user availability reaching a particular time threshold remaining, graphically adjusting said output to specifically indicate said current remaining user availability reaching said particular time threshold.

8. The system for tracking user availability according to claim 1, said means for adjusting said output of said remaining user availability as time passes to indicate a current remaining user availability further comprising:

means, responsive to said current remaining user availability reaching a particular time threshold remaining, for graphically adjusting said output to specifically indicate said current remaining user availability reaching said particular time threshold.

9. A computer system for tracking user availability, said system comprising:

means for compiling time estimates of a remaining user availability for participation in a messaging session for a separate user from among a plurality of users currently available for participation in said messaging session;

means for specifying said compiled time estimates of said remaining user availability for output to at least one other user from among said plurality of users prior to said at least one other user initiating said messaging session with said separate user; and means for adjusting said output of said remaining user availability as time passes to indicate a current remaining user availability, such that said at least one other user is enabled to track said remaining user availability for said separate user.

10. The system for tracking user availability according to claim 9, said system further comprising:

means for compiling said time estimates, and specifying said compiled time estimates, at a messaging server communicatively connected to a plurality of client messaging systems each enabled to receive said specified compiled time estimates.

11. The system for tracking user availability according to claim 9, said means for compiling time estimates of a remaining user availability further comprising:

means for compiling said time estimates from a selection from among a schedule for said separate user, a set of scheduling preferences for said separate user, and a scheduling history for said separate user.

12. The system for tracking user availability according to claim 9, said means for specifying said compiled time estimates of said remaining user availability further comprising:

means for specifying said compiled time estimates for output to said at least one other user according to output preferences of said at least one other user.

13. The system for tracking user availability according to 9, said means for specifying said compiled time estimates of said remaining user availability further comprising:

means for specifying said compiled time estimates for output to said at least one other user according to a current time zone for said at least one other user.

14. The system for tracking user availability according to claim 9, said means for specifying said compiled time estimates of said remaining user availability further comprising:

means for graphically distinguishing in said output of said compiled time estimates between time scheduled by said separate user and time estimated by said messaging server according to a set of scheduling preferences for said separate user and a scheduling history for said separate user.

15. A program for tracking user availability, residing on a computer usable medium having computer readable program code means, said program comprising:

means for compiling time estimates of a remaining user availability for participation in a messaging session for a separate user from among a plurality of users currently available for participation in said messaging session;

means for specifying said compiled time estimates of said remaining user availability for output to at least one other user from among said plurality of users prior to said at least one other user initiating said messaging session with said separate user; and means for adjusting said output of said remaining user availability as time passes to indicate a current remaining user availability.

16. The program for tracking user availability according to claim 15, said program further comprising:

means for compiling said time estimates, and specifying said compiled time estimates, at a messaging server communicatively connected to a plurality of client messaging systems each enabled to receive said specified compiled time estimates.

17. The program for tracking user availability according to claim 15, said means for compiling time estimates of a remaining user availability further comprising:

means for compiling said time estimates from a selection from among a schedule for said separate user, a set of scheduling preferences for said separate user, and a scheduling history for said separate user.

18. The program for tracking user availability according to claim 15, said means for specifying said compiled time estimates of said remaining user availability further comprising:

means for specifying said compiled time estimates for output to said at least one other user according to output preferences for said at least one other user.

19. The program for tracking user availability according to claim 15, said means for specifying said compiled time estimates of said remaining user availability further comprising:

means for specifying said compiled time estimates for output to said at least one other user according to a current time zone for said at least one other user.

20. The program for tracking user availability according to claim 15, said means for specifying said compiled time estimates of said remaining user availability further comprising:

means for graphically distinguishing in said output of said compiled time estimates between time scheduled by said separate user and time estimated by said messaging server according to a set of scheduling preferences for said separate user and a scheduling history for said separate user.

* * * * *